(12) United States Patent
Meltzer et al.

(10) Patent No.: US 7,666,378 B2
(45) Date of Patent: Feb. 23, 2010

(54) HIGH QUANTUM YIELD WHITE PHOSPHORS AND METHODS OF MAKING

(75) Inventors: Richard S. Meltzer, Athens, GA (US); Sergey Feofilov, Petersburg (RU); Yi Zhou, Athens, GA (US)

(73) Assignee: University of Georgia Research Foundation, Inc., Athens, GA (US)

( * ) Notice: Subject to any disclaimer, the term of this patent is extended or adjusted under 35 U.S.C. 154(b) by 0 days.

(21) Appl. No.: 12/217,587

(22) Filed: Jul. 7, 2008

(65) Prior Publication Data

US 2009/0010830 A1 Jan. 8, 2009

Related U.S. Application Data

(60) Provisional application No. 60/947,998, filed on Jul. 5, 2007.

(51) Int. Cl.
*C01F 17/00* (2006.01)

(52) U.S. Cl. .................................. 423/263; 252/301.4
(58) Field of Classification Search .................. 423/263; 252/301.4

See application file for complete search history.

(56) References Cited

U.S. PATENT DOCUMENTS

| 5,644,193 | A | * | 7/1997 | Matsuda et al. | ............. 313/486 |
| 2008/0067472 | A1 | * | 3/2008 | Roth et al. | ............ 252/301.6 S |

* cited by examiner

*Primary Examiner*—Stuart Hendrickson
*Assistant Examiner*—Michelle Hou
(74) *Attorney, Agent, or Firm*—Thomas, Kayden, Horstemeyer & Risley, LLP

(57) ABSTRACT

Embodiments of the present disclosure include a composition comprising a $Gd^{3+}$-$Eu^{3+}$ white phosphor composition, methods of making the composition, and the like.

9 Claims, 16 Drawing Sheets

(16 of 16 Drawing Sheet(s) Filed in Color)

HIGH QUANTUM YIELD WHITE PHOSPHORS AND METHODS OF MAKING

CROSS-REFERENCE TO RELATED APPLICATION

This application claims priority to co-pending U.S. provisional application having Ser. No. 60/947,998, filed on Jul. 5, 2007, to Meltzer, et al., which is entirely incorporated herein by reference.

STATEMENT REGARDING FEDERALLY SPONSORED RESEARCH OR DEVELOPMENT

This invention was made with government support under Grant No.'s 0305400 and 0305449 awarded by the National Science Foundation. The U.S. government has certain rights in the invention.

BACKGROUND

There is an interest in mercury-free lamps for general lighting and for plasma displays. However, this requires new phosphors that are excited in the vacuum ultraviolet (VUV). A white phosphor would have advantages over those used in the usual lamps in that only one material would be required to provide white light rather than the present schemes that require a mixture of phosphors providing different colors. It could also be used as white light backlighting in displays.

SUMMARY

Embodiments of the present disclosure include a composition comprising a $Gd^{3+}$-$Eu^{3+}$ white phosphor composition, methods of making the composition, and the like.

Briefly described, embodiments of the present disclosure include a nearly white phosphor composition comprising $GdZrF_7$:Eu.

Embodiments of the present disclosure also include a method of making $GdZrF_7$:Eu comprising: mixing in molar equivalents about 0.85 to 0.99 $GdF_3$, about 1.0 to 1.12 $ZrF_4$, about 0.005 to 0.075 $Eu_2O_3$, and about 0.5 to 3.0 $NH_4F$ and grinding the mixture; charging the mixture into a capped carbon crucible; and heating the mixtures at about 730 to 750° C. for about 1 to 3 hours.

BRIEF DESCRIPTION OF THE DRAWINGS

Many aspects of this disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

The patent or application file contains at least one drawing executed in color. Copies of this patent or patent application publication with color drawing(s) will be provided by the Office upon request and payment of the necessary fee.

DETAILED DESCRIPTION

Figure 1:
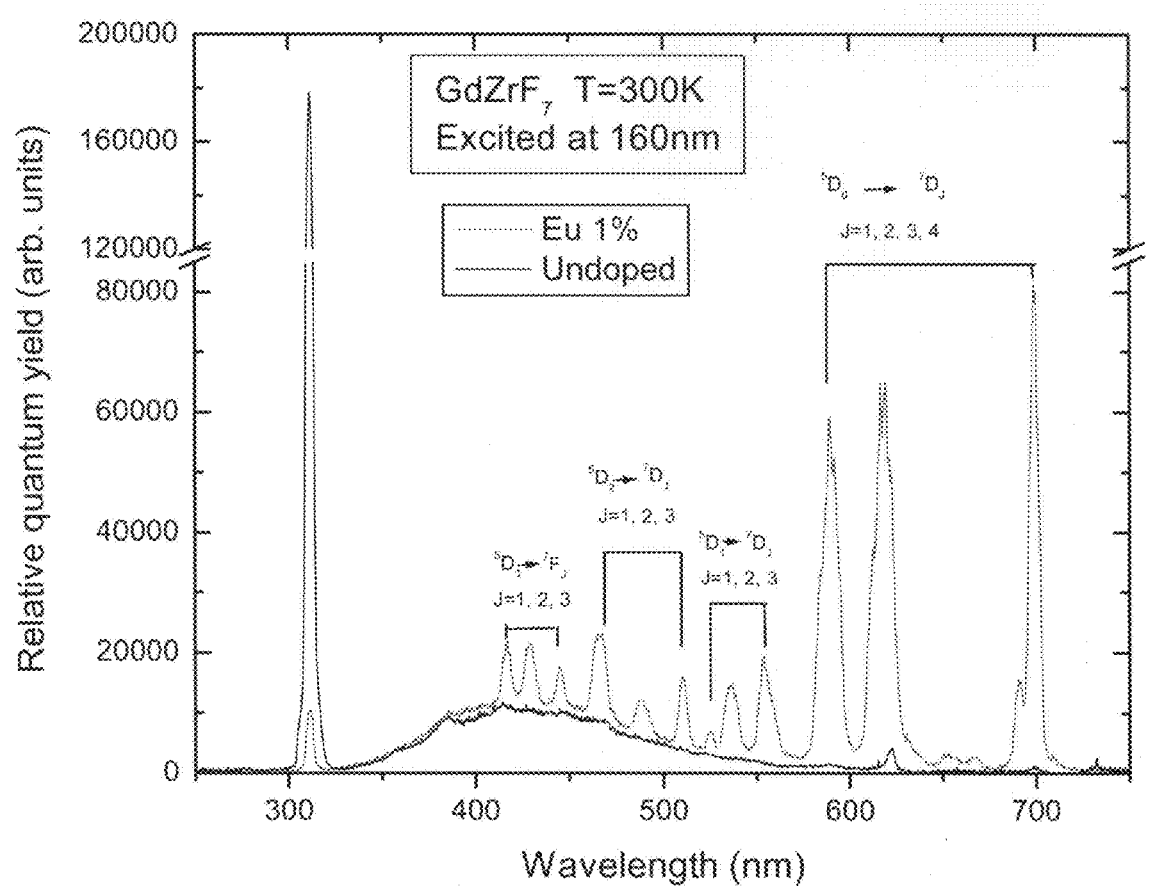
FIG. 1 is a graph that illustrates the emission spectra of undoped and 1% molar equivalents-$Eu^{3+}$-doped $GdZrF_7$. For the undoped, the broad emission band likely arises from a STE and sharp $Gd^{3+}$ $^6P$ emission. For the $Eu^{3+}$-doped, the $Gd^{3+}$ emission is effectively converted to $Eu^{3+}$ emission by ET, but there appears to be very little direct transfer from the STE to $Eu^{3+}$.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of physics, chemistry, and the like, which are within the skill of the art. Such techniques are explained fully in the literature.

The following examples are put forth so as to provide those of ordinary skill in the art with a complete disclosure and description of how to perform the methods and use the probes disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a compound" includes a plurality of compounds. In this specification and in the claims that follow, reference will be made to a number of terms that shall be defined to have the following meanings unless a contrary intention is apparent.

Discussion

Embodiments of the present disclosure include $Gd^{3+}$-$Eu^{3+}$ white phosphor compositions, methods of making $Gd^{3+}$-$Eu^{3+}$ white phosphor compositions, and the like. In particular, embodiments of the present disclosure include $Gd^{3+}$-$Eu^{3+}$ high quantum yield phosphor compositions. The $Gd^{3+}$-$Eu^{3+}$ white phosphor composition can include, but is not limited to, $GdZrF_7$ doped with $Eu^{3+}$ (e.g., $GdZrF_7$:Eu).

In an embodiment, the composition includes about 0.1% to 10.0% molar equivalent $Eu^{3+}$-doped $GdZrF_7$. In another embodiment, the composition includes about 1% molar equivalent $Eu^{3+}$-doped $GdZrF_7$ In an embodiment, the $GdZrF_7$ doped with $Eu^{3+}$ can be excited under vacuum via UV excitation.

Embodiments of the present disclosure include the addition of lanthanides including, but not limited to, Tm, Tb, and Pr. In an embodiment, the composition includes about 0.5 to 1% molar equivalent Tm, Tb, or Pr. The addition of lanthanides may be used to fine tune the color of the phosphor.

$GdZrF_7$:Eu has a high quantum yield and produces an emission that is substantially white in color (e.g., the CIE coordinates for $GdZrF_7$:Eu are x=0.37 and y=0.28; a "white" phosphor would have coordinates x=y=0.33). In an embodiment, $GdZrF_7$:Eu is a nearly white phosphor (e.g., blue STE and $Eu^{3+ 5}D_J$) with a quantum yield approaching 1 and is excitable in the VUV.

The $Gd^{3+}$-$Eu^{3+}$ white phosphor composition could be used in white VUV-excited phosphor in rare gas discharge lamps or in plasma displays. In addition, the $Gd^{3+}$-$Eu^{3+}$ white phosphor composition could be used in fluorescent lamps. The color of the phosphor can be fine-tuned by adding other lanthanides as dopants in the $GdZrF_7$ host. Examples include Pr, Tb or Tm, but other lanthanides may also be useful, such as Sm.

Embodiments of the present disclosure include a method of making a phosphor comprising: mixing in molar equivalents about 0.85 to 0.99 $GdF_3$, about 1 to 1.12 $ZrF_4$, about 0.005 to 0.075 $Eu_2O_3$, and about 0.5 to 3 $NH_4F$ and grinding the mixture; charging the mixture into a capped carbon crucible; and heating the mixtures at about 730 to 750° C. for about 1 to 3 hours.

In an embodiment, the method of making a phosphor further comprises: placing the capped carbon crucible inside a larger carbon crucible; placing the carbon crucibles in an alumina crucible; and filling the space between the alumina and carbon crucibles with graphite powder.

Embodiments of the present disclosure include a method of making the phosphor where the phosphor is about 0.1% to 10% Eu molar equivalent doped $GdZrF_7$. Embodiments of the present disclosure include a method of making the phosphor where the phospor is about 1% Eu molar equivalent doped $GdZrF_7$. Another embodiment includes a method of making the phosphor where the phosphor is $GdZrF_7$:Eu.

In an embodiment of the $Gd^{3+}$-$Eu^{3+}$ white phosphor composition, the emission has three contributions: (1) $^6P$ of $Gd^{3+}$ in the UV at about 313 nm, (2) emission from what is probably a self-trapped exciton producing a broad band in the blue, and (3) emission from $Eu^{3+}$ mainly in the red from $^5D_0$, but with contributions over the rest of the visible from transitions from all $^5D_J$ levels, which appear here because of the slow rates of multiphonon decay due to the very low vibrational frequencies in this lattice.

Although not intending to be bound by theory, it is believed that the initial absorption occurs in the host valence to conduction band transition, followed by the rapid formation of the self-trapped exciton, and that energy transfer then occurs first to $Gd^{3+}$ and then to $Eu^{3+}$. All three centers contribute to the emission. The material absorbs strongly in the vacuum ultraviolet. The total quantum yield for all emission is nearly 1 for excitation at about 175 nm, which matches well with the about 170 nm emission of a Xenon discharge.

Embodiments of the present disclosure use the self-trapped exciton (STE) to sensitize the $Gd^{3+}$ excitation, which then transfers energy to $Eu^{3+}$. In an embodiment, visible emission occurs both from the STE and from $Eu^{3+}$.

Embodiments of the present disclosure include energy transfer processes involving $STE \rightarrow Gd^{3+}(^6P) \rightarrow Eu^{3+}$ ($^5D_3 \rightarrow ^5D_2 \rightarrow ^5D_1 \rightarrow ^5D_0$). Embodiments of the present disclosure include the $STE \rightarrow Gd^{3+}$ energy transfer, which occurs by dipole-dipole or exchange interactions due to the overlap of the high energy tail of the STE emission and $Gd^{3+}$ $^6P$ absorption, which rate increases strongly with temperature (T).

In an embodiment, $Gd^{3+}$ transfers energy very effectively to $Eu^{3+}$, and the rate is proportional to the $Eu^{3+}$ acceptor concentration.

Embodiments of the present disclosure include a mechanism for the $STE \rightarrow Gd^{3+}$ energy transfer. Since the $Gd^{3+}$ is present at 100% concentration, although not intending to be bound by theory, it seems unlikely that mobility of the STE is important in the dynamics. The $STE \rightarrow Gd$ energy transfer results from the weak overlap of the high energy tail of the STE emission and the $^6P$ $Gd^{3+}$ absorption. The mechanism can be either the dipole-dipole or exchange interaction. The temperature dependence of the $STE \rightarrow Gd$ energy transfer rate results from the increased overlap as the STE broadens with temperature. Although not intending to be bound by theory, the surprisingly low energy transfer rate at this 100% concentration probably arises from the very poor overlap of the STE emission and $Gd^{3+}$ absorption. Despite the relatively slow energy transfer rates, it still effectively competes with the slow radiative rates to produce significant energy transfer to $Gd^{3+}$ thereby yielding a combination of self-trapped exciton and $Eu^{3+}$ emission which makes possible a nearly white phosphor.

EXAMPLES

Example 1

Introduction

A luminescence study in the monoclinic $GdZrF_7$ compound was carried out since its structural information was provided by Michel Poulain at 1972. Kolk et al. did the VUV excitation study in $Pr^{3+}$ doped $LaZrF_7$ compound. They showed photon cascade emission (PCE) of $Pr^{3+}$ and the energy transfer from STE to $Pr^{3+}$. We studied the related material, $GdZrF_7$ and $Eu^{3+}$-doped $GdZrF_7$.

$GdZrF_7$:Eu is a nearly white phosphor with a quantum yield approaching 1 and is excitable in the VUV. It does not exhibit quantum cutting, but is of interest in the problem of sensitizing Gd, which is a quantum cutter. We used the STE to sensitize the Gd excitation, which then transfers energy to $Eu^{3+}$.

Visible emission occurs both from the STE and from $Eu^{3+}$. The dynamics of these energy transfer processes as a function of temperature were studied in detail in both undoped and Eu-doped $GdZrF_7$ to determine the feeding and loss mechanisms.

Emission Spectrum

The emission spectrum of an undoped and a 1% $Eu^{3+}$-doped $GdZrF_7$ sample at 300 K is shown in FIG. 1. Both of these two samples have a broad STE emission which peaks at 420 nm. For the undoped sample, one can see broad emission band likely arising from a STE and sharp $Gd^{3+}$ $^6P$ emission. For the 1% molar equivalents $Eu^{3+}$ doped sample, the low intensity of the $Gd^{3+}$ $^6P$ emission suggests the efficient energy transfer from $Gd^{3+}$ to $Eu^{3+}$($^6P \rightarrow ^5D_3 \rightarrow ^5D_2 \rightarrow ^5D_1 \rightarrow ^5D_0$), but there appears to be very little direct transfer from the STE to $Eu^{3+}$.

Figure 3:
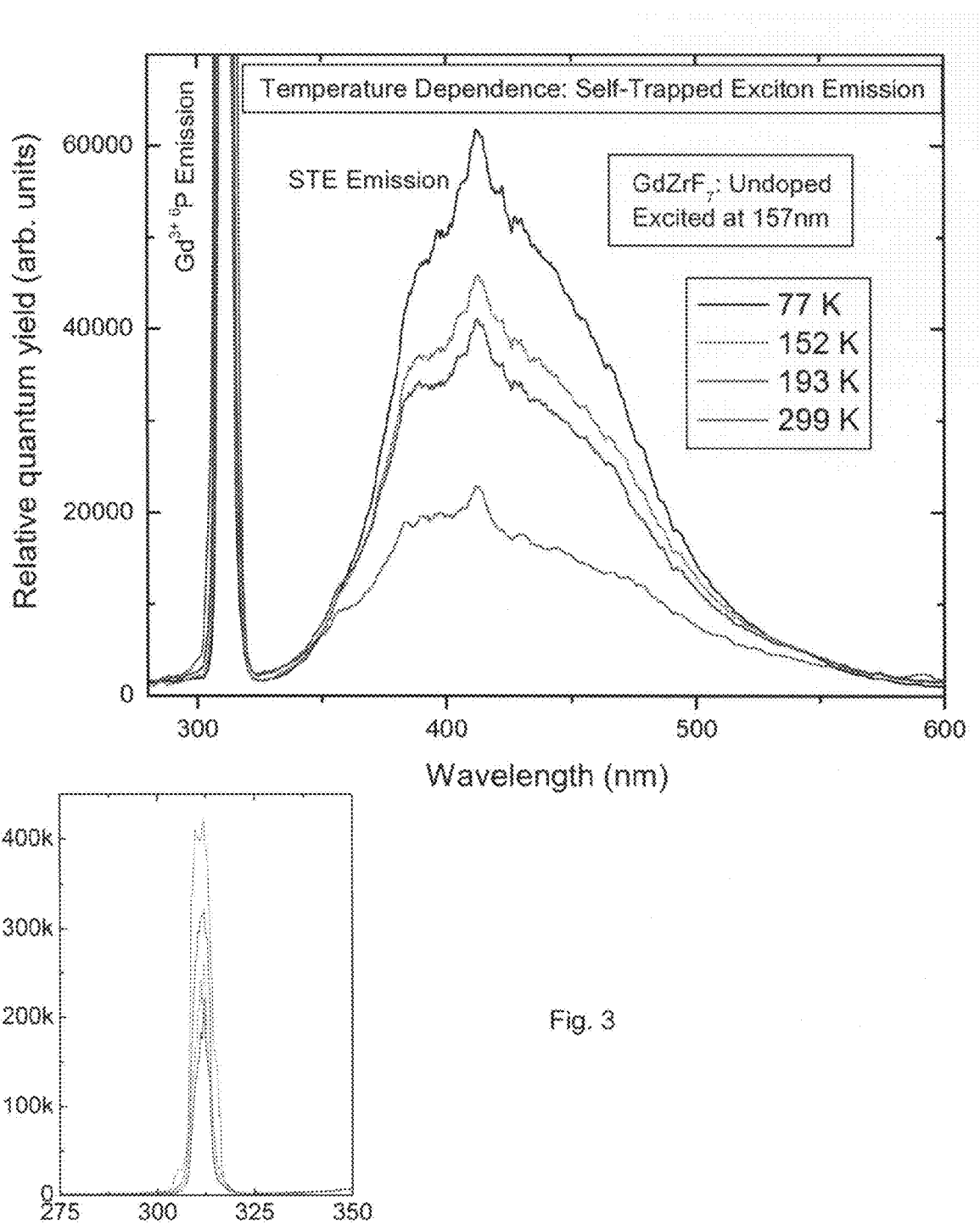
FIG. 3 is a graph that illustrates temperature dependence: self-trapped exciton emission for $GdZrF_7$: undoped excited at 157 nm. The integrated intensity of the STE decreases with increase in T. The $Gd^{3+}$ $^6P$ emission increases as the STE emission decreases. There is a temperature-dependent STE→Gd energy transfer.

The undoped $GdZrF_7$ was cooled to L. N. to study temperature dependence of the emission. The spectrum is shown in FIG. 3. One can see that the integrated intensity of the STE decreases with increase in temperature. Meanwhile, the $Gd^{3+}$ $^6P$ emission increases as the STE emission decreases. Therefore, there is a temperature-dependent $STE \rightarrow Gd$ energy transfer in this sample.

Figure 4:
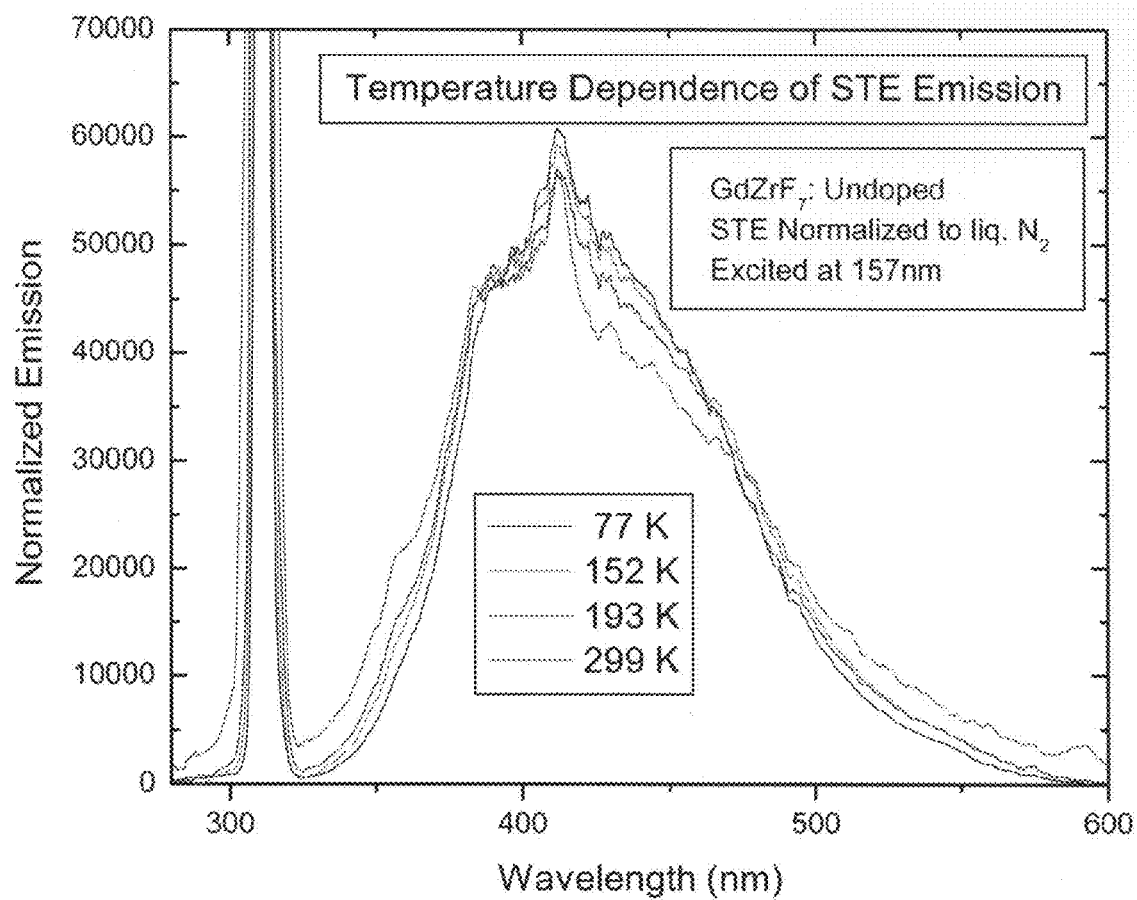
FIG. 4 is a graph that illustrates temperature dependence of STE emission. The STE emission broadens with an increase in T. The overlap of the STE emission with the $Gd^{3+}$ $^6P$ absorption increases with T.

When the emission of STE was normalized at different temperatures to the emission at L. N., one can see the STE emission broadens with an increase in T. The overlap of the STE emission with the $Gd^{3+}$ $^6P$ absorption increases with T. This is shown in FIG. 4.

Excitation Spectrum

Figure 2:
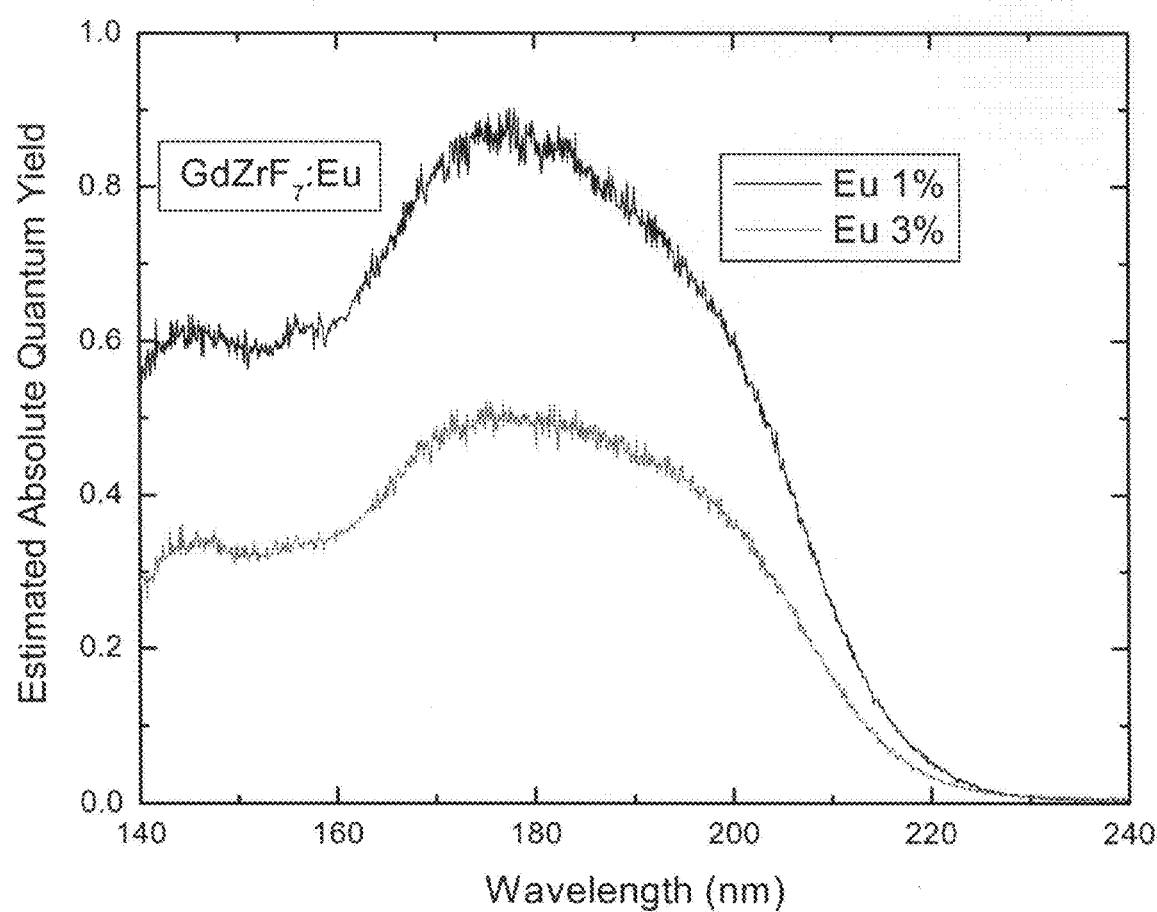
FIG. 2 is a graph that illustrates excitation spectra for 1% and 3% molar equivalents-$Eu^{3+}$-doped $GdZrF_7$. There is a very high quantum yield approaching unity (assumes absolute QY of NaSal and $Y_2O_3$:Eu are 0.6 at 160 nm).

The excitation spectrum of $Eu^{3+}$-doped $GdZrF_7$ relative to sodium salicylate is shown in FIG. 2. One can see that the quantum yield of this sample is about unity. This suggests that there is no quantum cutting.

Temperature Dependence of Emission Dynamics

Figure 14:
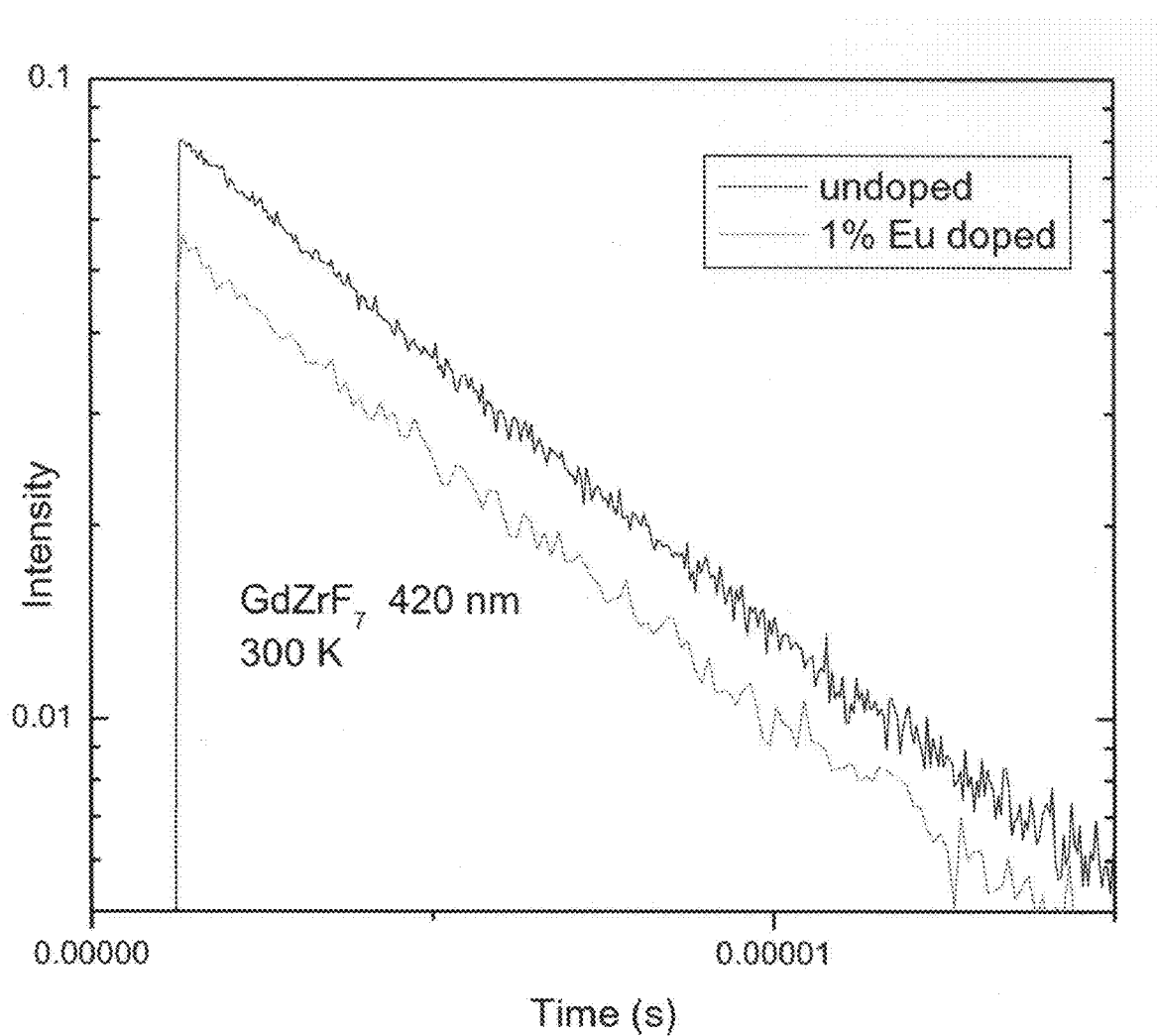
FIG. 14 is a graph that illustrates time dependence of the emission of undoped and Eu-doped $GdZrF_7$.

At room temperature, the lifetime of the STE emission of the undoped sample is almost the same as the sample containing 1% $Eu^{3+}$. This observation is consistent with very little direct transfer from the STE to $Eu^{3+}$. It is shown in FIG. 14.

Figure 5:
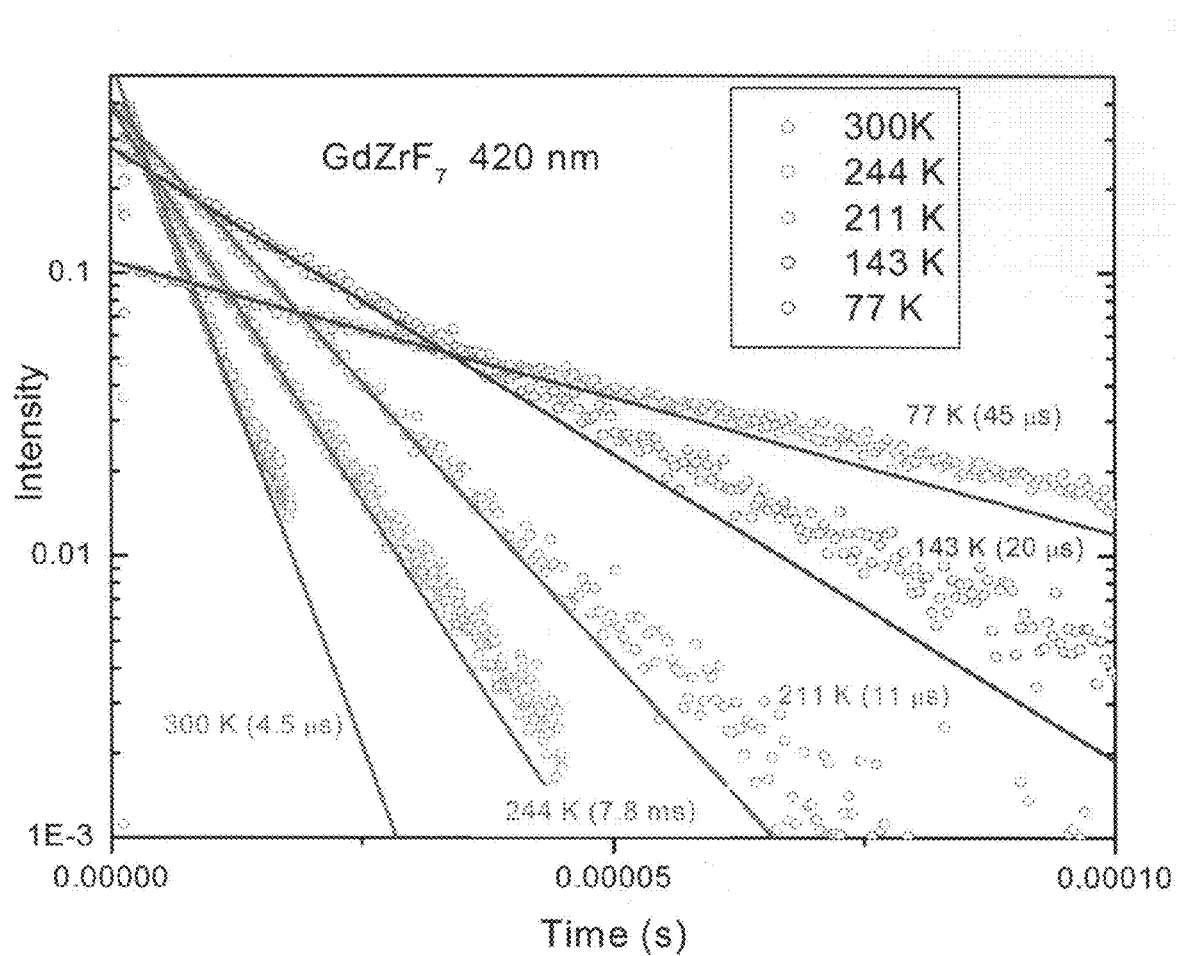
FIG. 5 is a graph that illustrates the decay of the STE as a function of temperature. The decay rate increases with temperature. The decay is nearly exponential (decay times in parenthesize).
Figure 6:
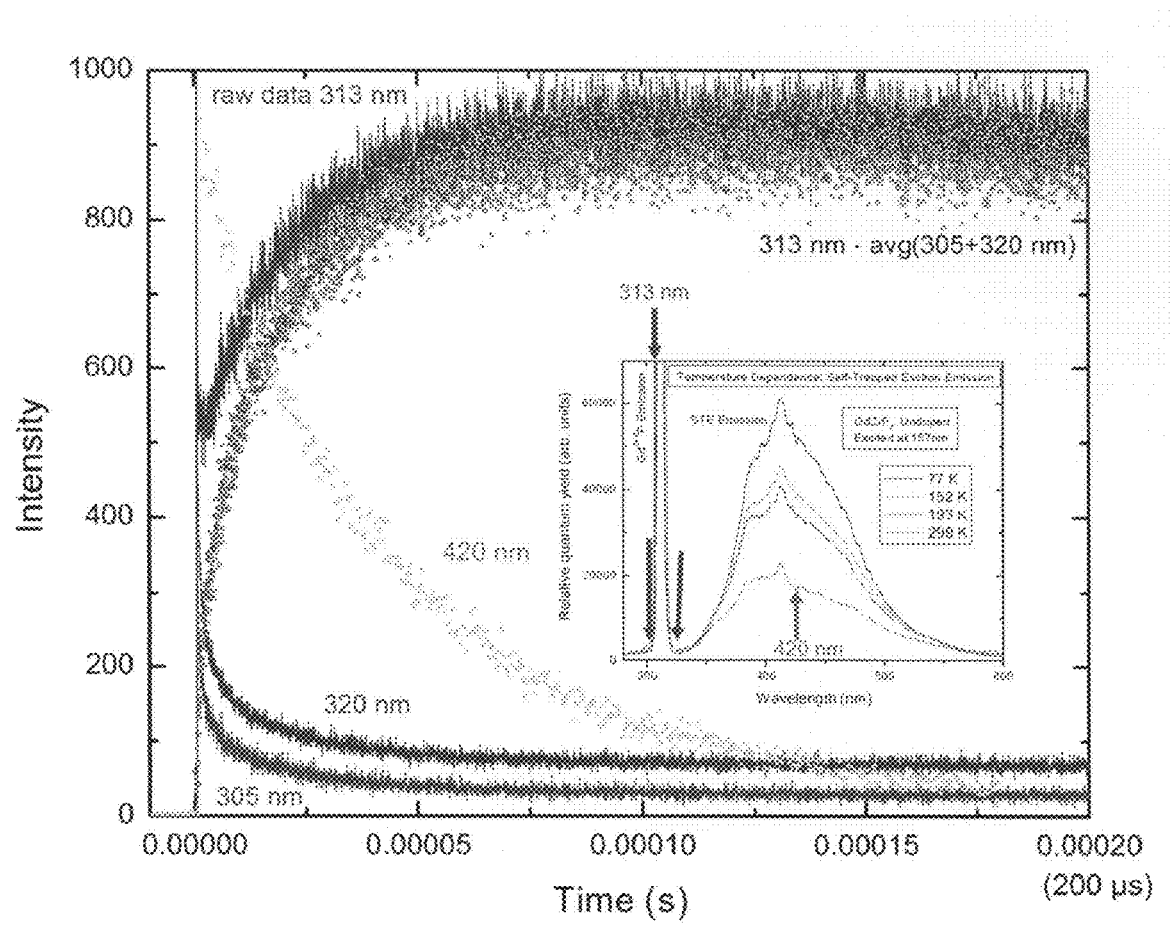
FIG. 6 is a graph that illustrates time dependence for $Gd^{3+}$ $^6P$ emission-$GdZrF_7$ undoped, T=77K. A broad background with a fast decay lies underneath the $^6P$ $Gd^{3+}$ emission. When this is subtracted from the total emission, the $^6P$ rises from zero at t=0. The background also has a slower component whose decay agrees with that of the main emission band.

The time dependence as a function of temperature of the STE emission at 420 nm in the undoped sample is shown in FIG. 5 under pulsed excitation at 157 nm. For the undoped sample, there is a striking increase in the lifetime as the temperature falls, reaching 45 µs at 77 K, and the decay is nearly exponential.

Figure 8:
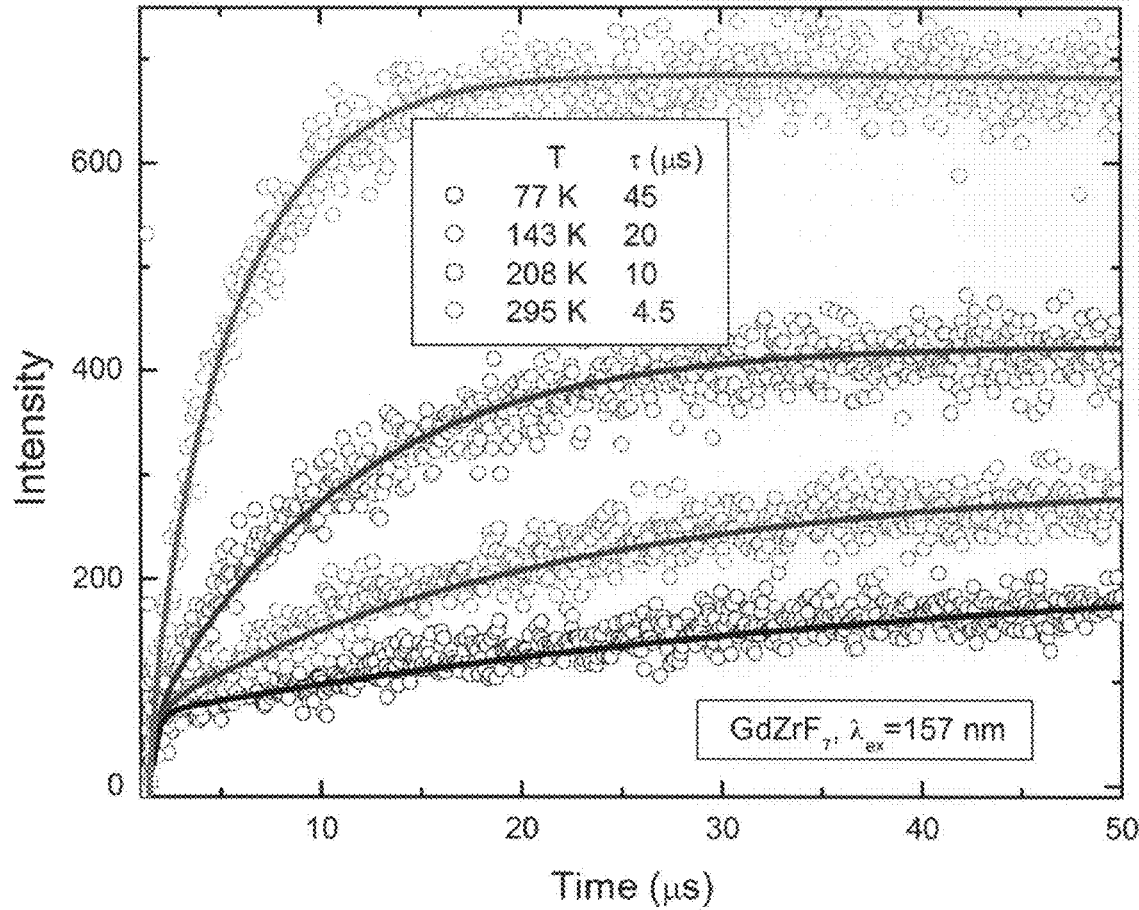
FIG. 8 is a graph that illustrates the fit to the $^6P$ $Gd^{3+}$ population buildup with two components. The fast component rise time is T-independent and nearly constant ($\tau$rise=0.35 μs). The slow component is identical to that of the STE decay and is T-dependent. The $Gd^{3+}$ $^6P$ emission intensity decreases at lower temperatures suggesting a reduced energy transfer from the STE.
Figure 9:
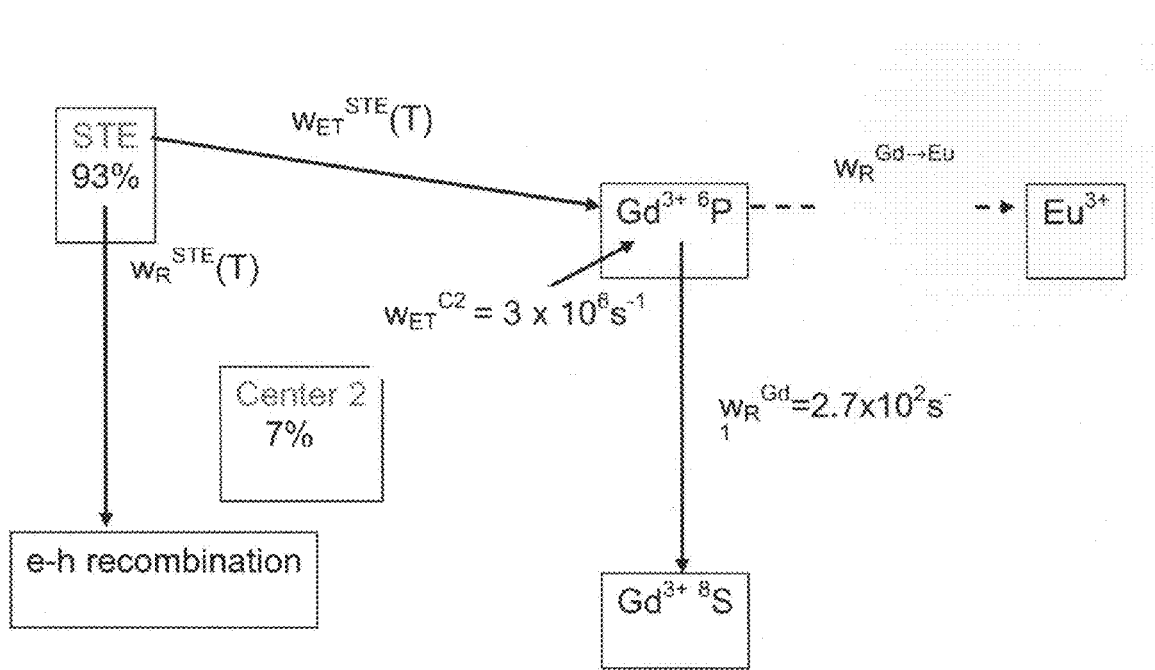
FIG. 9 illustrates a model for the dynamics of the populations. The temperature dependence of the STE radiatative ($w_R^{STE}(T)$) and the energy transfer rate to $Gd^{3+}$ ($w_{ET}^{STE}(T)$) are varied to fit the time dependence of both the STE and $Gd^{3+}$ $^6P$ emission. The model attempts to fit the temperature dependence of both the STE and $Gd^{3+}$ $^6P$ with regard to both the relative intensities and decay rates.
Figure 10:
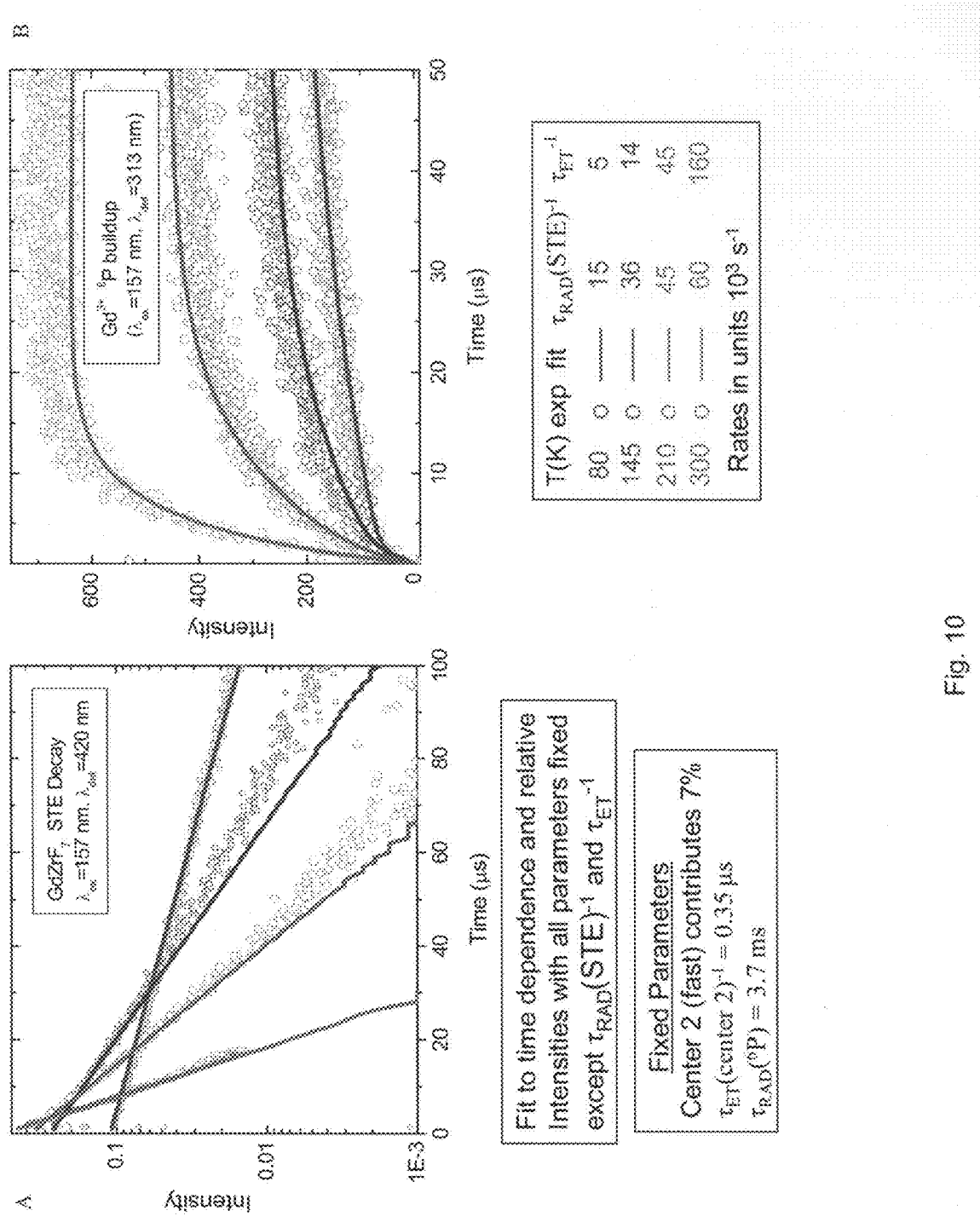
FIG. 10(A) is a graph that illustrates $GdZrF_7$ STE decay.
FIG. 10(B) is a graph that illustrates $Gd^{3+}$ $^6P$ buildup.
Figure 11:
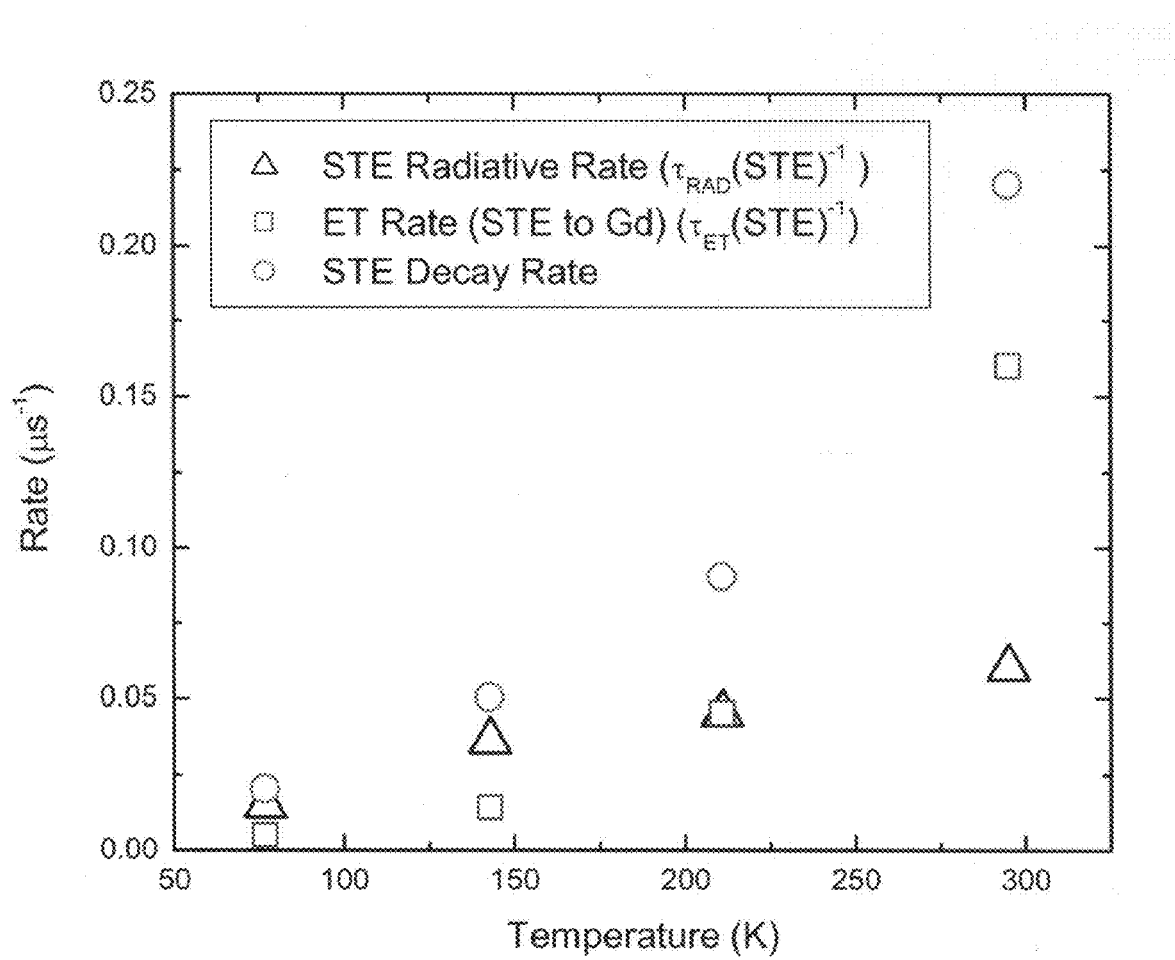
FIG. 11 is a graph that illustrates temperature dependence of the best-fit rates. The energy transfer rate to Gd increases rapidly with temperature. The STE radiative rate increases more slowly with increase in T.
Figure 12:
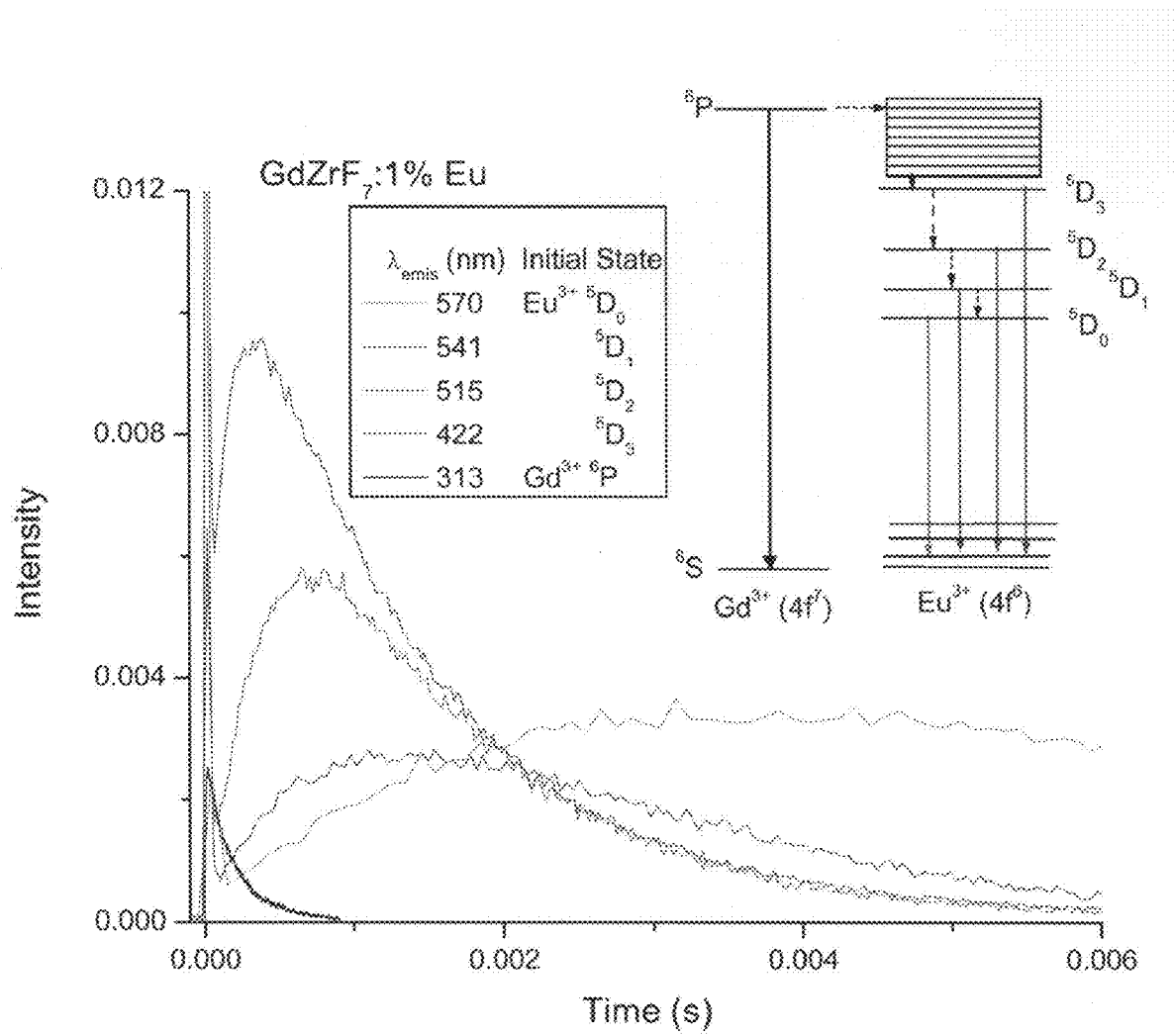
FIG. 12 is a graph that illustrates the dynamics of the $Gd^{3+}$→$Eu^{3+}$ energy transfer and $Eu^{3+}$ relaxation.
Figure 13:
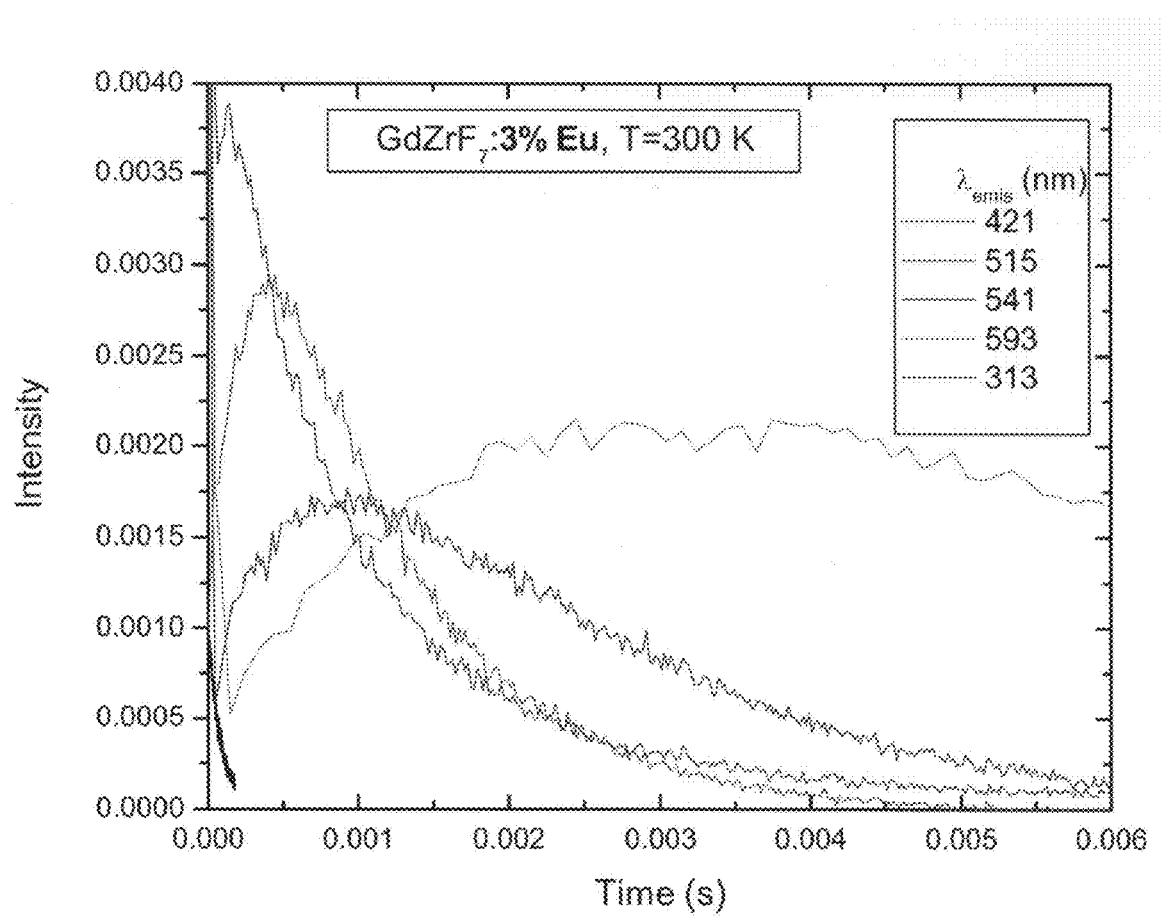
FIG. 13 is a graph that illustrates $Gd^{3+}$→$Eu^{3+}$ energy transfer rate increases in proportion to the $Eu^{3+}$ concentration.

The time dependence as a function of temperature of the $^6P$ emission of $Gd^{3+}$ at 313 nm in the undoped sample is shown in FIG. 8. It is shown that the $^6P$ $Gd^{3+}$ population buildup has two components. The fast component rise time is temperature independent and nearly constant ($\tau_{rise}$=0.35 µs). The slow component is identical to that of the STE decay and is temperature dependent. One also can see the $Gd^{3+}$ $^6P$ emission intensity decreases when temperature falls. This suggests a reduced energy transfer from the STE at lower temperatures.

Figure 15:
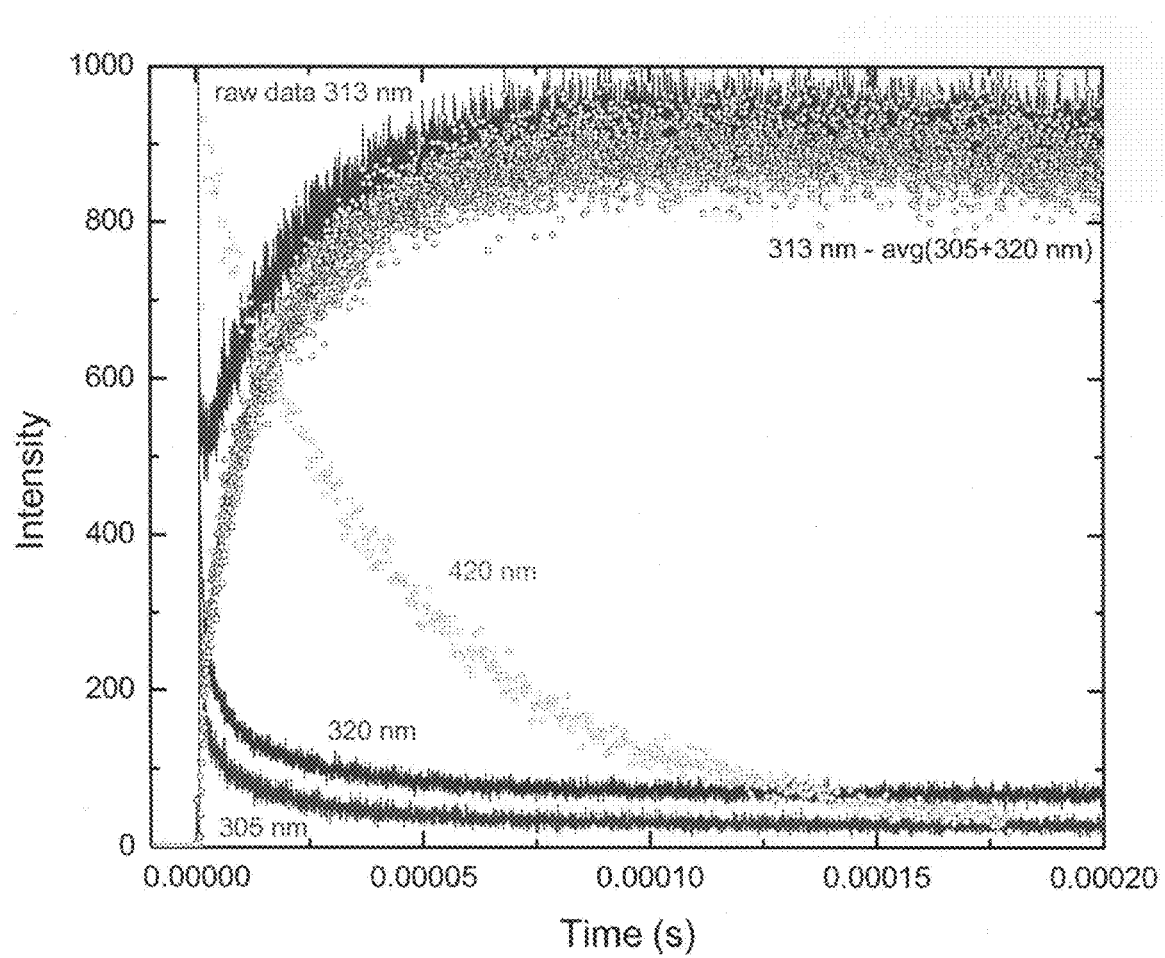
FIG. 15 is a graph that illustrates time dependence of $Gd^{3+}$ $^6P$ emission of undoped $GdZrF_7$ at L.N.
Figure 16:
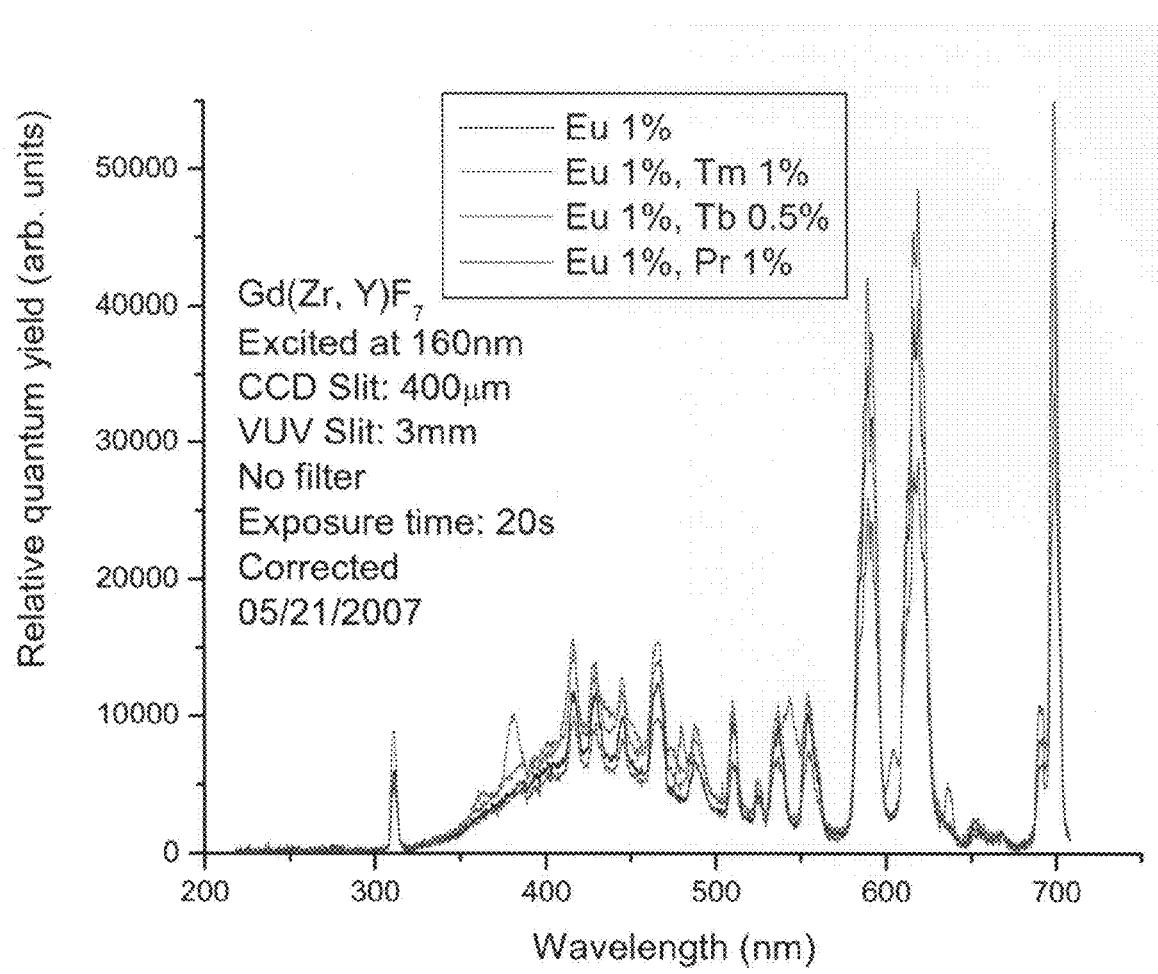
FIG. 16 is a graph that illustrates that the addition of other lanthanides can be used to fine-tune the color of the phosphor.

The time dependence $Gd^{3+}$ $^6P$ emission of undoped $GdZrF_7$ at L. N. is shown in FIG. 15. We find a broad background with a fast decay lies underneath the $^6P$ $Gd^{3+}$ emission. When we subtract this broad background from the total emission, the $^6P$ rises from zero at t=0. This broad background also has a slower component whose decay agrees with that of the main STE emission band.

Figure 7:
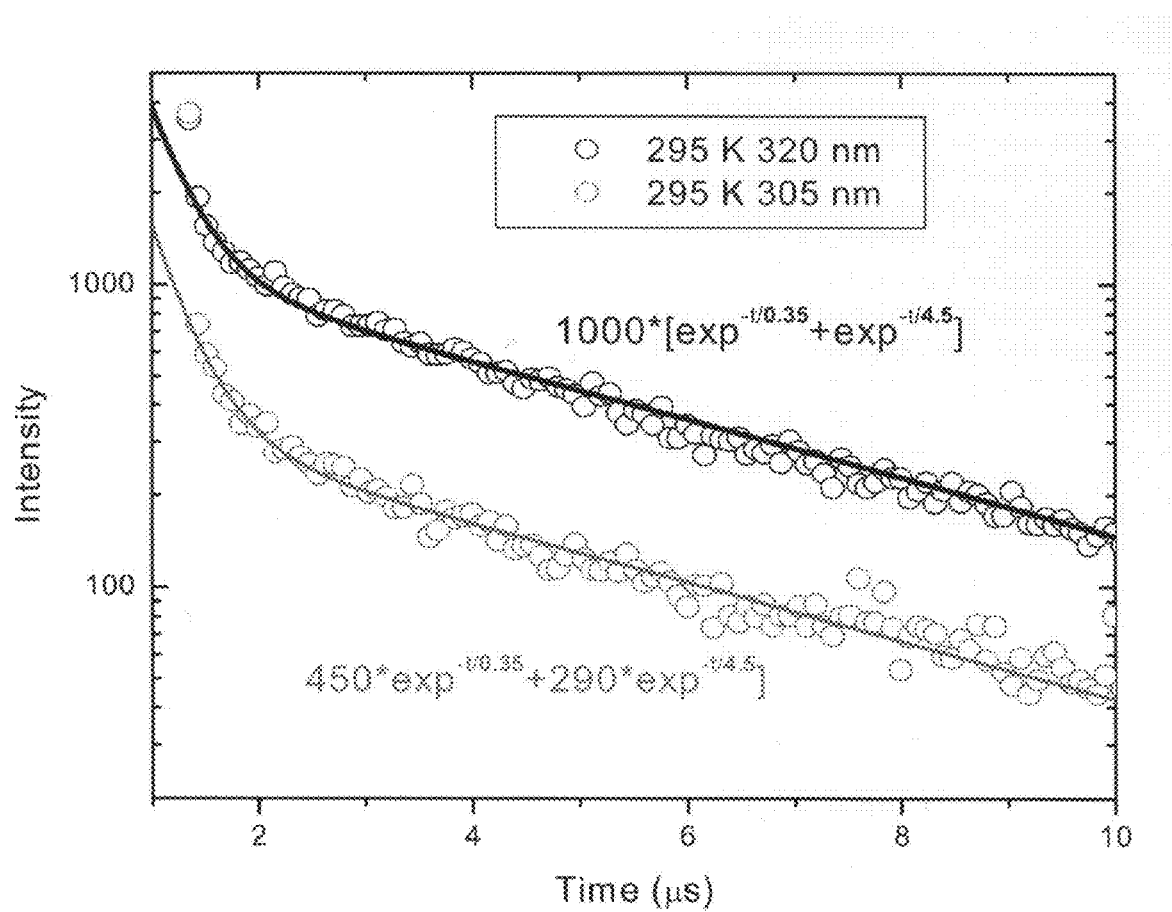
FIG. 7 is a graph that illustrates a study of the fast component of the broad background. The fast component has a decay of 0.35 μs and is found to be independent of T. The slow component of the decay is the same as that of the main STE emission. This suggests the presence of two types of centers, the fast one occurring at shorter wavelengths than that of the slower (STE).

The study of two components of the broad background is shown in FIG. 7. The fast component has a decay of 0.35 μs and is found to be independent of temperature. The slow component of the decay is the same as that of the main STE emission. This suggests the presence of two types of centers, the fast one occurring at shorter wavelengths than that of the slower (STE).

Mechanism for the STE→$Gd^{3+}$ Energy Transfer

Since the $Gd^{3+}$ is present at 100% concentration, it seems unlikely that mobility of the STE is important in the dynamics. The STE→$Gd^{3+}$ energy transfer results from the weak overlap of the high energy tail of the STE emission and the $^6P$ $Gd^{3+}$ absorption. The mechanism can be either the dipole-dipole or exchange interaction. The temperature dependence of the STE→$Gd^{3+}$ energy transfer rate results from the increased overlap as the STE broadens with temperature. The surprisingly low energy transfer rate at this 100% concentration probably arises from the very poor overlap of the STE emission and $Gd^{3+}$ absorption. Despite the relatively slow energy transfer rates, it still effectively competes with the slow radiative rates to produce significant energy transfer to $Gd^{3+}$.

Conclusions

From the results discussed above, we find $Eu^{3+}$-doped $GdZrF_7$ has a quantum yield approaching 1, and it is a nearly white phosphor because of blue STE and red $Eu^{3+}$ $^5D_J$.

The energy transfer processes involve STE→$Gd^{3+}$ ($^6P$)→$Eu^{3+}$($^5D_3$→$^5D_2$→$^5D_1$→$^5D_0$). The STE→$Gd^{3+}$ energy transfer occurs by dipole-dipole or exchange interactions due to the overlap of the high energy tail of the STE emission and $Gd^{3+}$ $^6P$ absorption. Its rate increases strongly with temperature. $Gd^{3+}$ transfers energy very effectively to $Eu^{3+}$, and the rate is proportional to the $Eu^{3+}$ acceptor concentration. The STE seems to be an effective means of coupling energy into $Gd^{3+}$.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include ±1%, ±2%, ±3%, ±4%, ±5%, ±6%, ±7%, ±8%, ±9%, or ±10%, or more of the numerical value(s) being modified. In addition, the phrase "about 'x' to 'y'" includes "about 'x' to about 'y'".

It should be emphasized that the above-described embodiments of the present disclosure, particularly, any "preferred" embodiments, are merely possible examples of implementations, and are merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

Therefore, at least the following is claimed:

1. A nearly white phosphor composition comprising: $GdZrF_7$:Eu, wherein the phosphor is about 0.1% to 10% Eu molar equivalent doped $GdZrF_7$.

2. The composition of claim 1, wherein the quantum yield is about one.

3. The composition of claim 1, wherein the phosphor is about 1% Eu molar equivalent doped $GdZrF_7$.

4. The composition of claim 1, further comprising a lanthanide selected from Tm, Tb, or Pr.

5. A method of making a phosphor comprising:
   mixing in molar equivalents about 0.85 to 0.99 $GdF_3$, about 1 to 1.12 $ZrF_4$, about 0.005 to 0.075 $Eu_2O_3$, and about 0.5 to 3 $NH_4F$;
   grinding the mixture;
   charging the mixture into a capped carbon crucible; and
   heating the mixture at about 730 to 750° C. for about 1 to 3 h.

6. The method of claim 5, further comprising:
   placing the capped carbon crucible inside a larger carbon crucible;
   placing the carbon crucibles in an alumina crucible; and
   filling the space between the alumina and carbon crucibles with graphite powder.

7. The method of claim 5, wherein the phosphor is about 0.1% to 10% Eu molar equivalent doped $GdZrF_7$.

8. The method of claim 5, wherein the phosphor is about 1% Eu molar equivalent doped $GdZrF_7$.

9. The method of claim 5, wherein the phosphor is $GdZrF_7$:Eu.

* * * * *